United States Patent [19]

D'Muhala

[11] Patent Number: 4,708,805

[45] Date of Patent: Nov. 24, 1987

[54] BARIUM SULFATE REMOVAL AND ANTI-DEPOSITION COMPOSITIONS AND PROCESS OF USE THEREFOR

[76] Inventor: Thomas F. D'Muhala, Geer Rd., Lebanon, Conn. 06249

[21] Appl. No.: 934,604

[22] Filed: Nov. 24, 1986

[51] Int. Cl.$^4$ ............................................... C02F 5/12
[52] U.S. Cl. ........................................ 210/698; 134/2; 134/22.14; 134/22.19; 134/42; 252/82; 252/180; 252/148
[58] Field of Search ............... 210/698; 252/82, 148, 252/180; 134/2, 22.14, 22.19, 42

[56] References Cited

U.S. PATENT DOCUMENTS

| | | | |
|---|---|---|---|
| 3,296,027 | 1/1967 | Jacklin | 252/82 |
| 3,297,580 | 1/1967 | Pitzer | 252/148 |
| 3,308,065 | 3/1967 | Lesinski | 252/82 |
| 3,686,123 | 8/1972 | Hiroshi | 252/82 |
| 3,859,337 | 1/1975 | Herz et al. | 252/82 |
| 4,190,462 | 2/1980 | De Jong et al. | 252/82 |
| 4,609,757 | 9/1986 | D'Muhala et al. | 564/151 |

FOREIGN PATENT DOCUMENTS 60-138082 7/1985 Japan ........................ 252/82
2113254A 8/1983 United Kingdom ........... 252/82

Primary Examiner—Robert A. Wax
Attorney, Agent, or Firm—Roy F. House

[57] ABSTRACT

The invention provides a process for the sequestration of barium sulfate scale and barium sulfate sequestrant compositions therefor comprising an aqueous solution of citric acid (CA), a polycarbazic acid (PA), and an alklyenepolyaminopolycarboxylic acid (APAPCA), the weight ratio of CA to APAPCA being in the range from about 0.5 to 1 to about 11 to 1 and the weight ratio of PCA to APAPCA being in the range from about 0.002 to about 0.2, wherein the polycarbazic acid has the formula $(R)_2$—N—$[CH_2CH_2N(R)]_m$—R where R is the group $CH_2$—CO—NH—NH—COOH and m is 0 or an integer from 1 to about 4, and wherein the APAPCA has the formula $(HOOC-CH_2)_2$—N—$[CH_2-CH_2-N(CH_2-COOH)]_n$—$CH_2COOH$ where n is an integer from 1 to about 4. The preferred aqueous sequestering solution has a pH in the range from about 9.5 to about 14, said pH being provided by a base selected from the group consisting of potassium hydroxide, potassium carbonate, and mixtures thereof.

11 Claims, No Drawings

BARIUM SULFATE REMOVAL AND ANTI-DEPOSITION COMPOSITIONS AND PROCESS OF USE THEREFOR

FIELD OF THE INVENTION

The invention relates to compositions which are effective in solubilizing strontium and barium sulfate, in preventing the deposition of barium and strontium sulfate scales, and to chemical methods of removing barium sulfate and strontium sulfate scales, deposits, crystals, etc., from surfaces.

BACKGROUND OF THE INVENTION

Most water contains alkaline earth metal cations, such as barium, strontium. calcium. and magnesium. and anions such as sulfate, bicarbonate, carbonate oxalate phosphate, silicate, flouride, etc. When combinations of these anions and cations are present in concentrations which exceed the solubility of their reaction products, preecipitates form until their product solubility concentrations are no longer exceeded. For example, when the barium ion and sulfate ion exceed the solubility of the barium sulfate reaction product, a solid phase of barium sulfate will form as a precipitate.

Solubility product concentrations are exceeded for various reasons, such as evaooration of the water phase, change in pH, pressure or temperature, and the introduction of additional ions which can form insoluble compounds with the ions already present in the solution.

As these reaction products precipitate on the surfaces of the water-carrying or water-containing system, they form adherent deposits or scale. The scale prevents effective heat transfer, interferes with fluid flow, facilitates corrosive processes, and harbors bacteria. Scale is an expensive problem in many industrial water systems, in production systems for oil and gas, in pulp and paper mill systems, and in other systems, causing delays and shutdowns for cleaning and removal.

Scale-forming compounds can be prevented from precipitating by inactivating their cations with chelating or sequestering agents, so that the solubility of their reaction products is not exceeded. Also, certain substances are known to function as scale or precipitation inhibitors in a potentially scale-forming system at a markedly lower concentration than that required for sequestering the scale cation. Such substances are known as "threshold active" compounds.

Once through and recirculating, cooling water systems are subject to the formation of scale deposits. Waterside problems encountered in boilers and steam systems include the formation of scale and other deposits, corrosion and foam. Scale and other deposits on heat-transfer surfaces can cause loss of the thermal efficiency of the boiler and can make the temperature of the boiler metal increase. Under scaling conditions, temperatures may go high enough to lead to failure of the metal due to overheating.

Barium and strontium sulfate scale deposits present a unique and sometimes "unsolvable" problem. Under most conditions, these sulfates are considerably less soluble in all solvents than any of the other commonly encountered scale-forming compounds. It is generally acknowledged that barium sulfate scale is almost impossible to remove by chemical means. Consequently, barium sulfate deposits must be removed mechanically or the equipment, pipes, etc., containing the deposit must be discarded.

The incidence of barium sulfate scale is worldwide, and it occurs principally in systems handling subsurface waters. The barium sulfate scale problem is of particular concern to the petroleum industry since increasing volumes of water are produced with petroleum and more petroleum is produced by the waterflooding method of secondary recovery. The scale may occur in many different places, including production tubing, gathering lines, meters, valves, and in other production equipment.

Barium sulfate scale may also form within subterranean formations such as in disposal wells. Scales and deposits can be formed to such an extent that the permeability of the formation is impaired resulting in lower flow rates, higher pump pressures, and ultimately abandonment of the well.

An excellent review of the state-of-the-art is presented in the book by Jack C. Cowan and Donald J. Weintritt entitled "Water-Formed Scale Deposits," 1976, Gulf Publishing Co., Houston, Tex. U.S.A. An informative article by O. J. G. Vetter entitled "How Barium Sulfate Is Formed: An Interpretation" was published in the December, 1975, issue of the Journal of Petroleum Technology at pages 1515-1524.

Thus there is a great need for a chemical system which will remove or enhance the removal of barium sulfate scales, deposits, or crystals from various surfaces, and which will inhibit or prevent the formation of barium sulfate when the chemical system is present under normal precipitate-forming conditions.

Accordingly, it is an object of this invention to provide chemical compositions which are effective in solubilizing barium sulfate scales, deposits, crystals, and the like, and in preventing the formation of barium sulfate.

It is another object of this invention to provide a method of solubilizing barium sulfate thus enabling the removal of adherent barium sulfate scales, deposits, crystals, etc. from surfaces, and a method of preventing the formation of barium sulfate.

SUMMARY OF THE INVENTION

I have now found novel, synergistic combinations of sequestering or chelating agents which are effective in sequestering the barium cation from barium sulfate thus solubilizing the barium sulfate enabling its removal from surfaces to which the barium sulfate adheres or from any other location where the presence of barium sulfate is undesireable. The compositons are also effective in preventing the formation of barium sulfate.

The novel barium sulfate sequestering compositions of my invention, which may sometimes hereinafter be referred to as BSS compositions, comprise:

(1) citric acid;
(2) a polycarbazic acid; and
(3) an alkylenepolyaminopolycarboxylic acid;

wherein the weight ratio of citric acid to the alkylenepolyaminopolycarboxylic acid is in the range from about 0.5 to 1 to about 11 to 1, and wherein the weight ratio of the polycarbazic acid to the aklylenepolyaminopolycarboxylic acid is within the range from about 0.002 to 1 to about 0.2 to 1.

The BSS compositions of my invention are also effective sequestrants for strontium sulfate scales, and also barium and strontium sulfate scales which have occluded therewith or cocrystallized therewith other insoluble salts such as those containing calcium, magnesium, iron, and the like. Thus it is to be understood that the term "barium sulfate" as used throughout this specification and claims refers also to strontium sulfate and impure mixtures of barium sulfate or strontium sulfate with other undesireable water-insoluble inorganic scales, deposits, crystals, and the like.

The invention also provides a process of solubilizing barium sulfate or other insoluble barium salt, or preventing the formation of barium sulfate when the solubility product of barium sulfate is exceeded, with an aqueous solution of a sequestrant mixture comprising citric acid and an alkylenepolyaminopolycarboxylic acid having a weight ratio of citric acid to alkylenepolyaminopolycarboxylic acid in the range from about 2 to 1 to about 7.33 to 1, the aqueous solution having a pH in the range from about 9.5 to about 14, the pH being obtained by neutralization of the sequestrant mixture with a base selected from the group consisting of potassium hydroxide, potassium carbonate, and mixtures thereof, or with an aqueous solution of the BSS composition of this invention, the aqueous solution also having a pH in the range from about 9.5 to about 14, the pH being obtained by neutralization of the BSS composition with an alkali metal or ammonium base preferably selected from the group consisting of potassium hydroxide, potassium carbonate, and mixtures thereof.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The barium sulfate sequestrant (BSS) compositions of my invention comprise citric acid (sometimes hereinafter referred to as CA for brevity, a polycarbazic acid (sometimes hereinafter referred to as PCA for brevity), and an alkylenepolyaminopolycarboxylic acid (sometimes hereinafter referred to as APAPCA for brevity, wherein the weight ratio of the CA to the APAPCA is within the range from about 0.5 to 1 to about 11 to 1, and wherein the weight ratio of the PCA to the APAPCA is within the range from about 0.002 to 1 to about 0.2 to 1. Preferably, the weight ratio of CA to APAPCA is within the range from about 0.5 to 1 to about 3.5 to 1 and the weight ratio of PCA to APAPCA is in the range from about 0.01 to 1 to about 0.1 to 1.

Citric acid, a known chelating agent, is a hydroxycarboxylic acid having the formula

HOOC—CH$_2$—C(OH)(COOH)—CH$_2$—COOH.

Other hydroxycarboxylic acid chelating agents, such as tartaric acid, gluconic acid, and the like, are not effective components in the BSS compositions of the invention as disclosed herein. The citric acid may be present in the BSS compositions as a water soluble salt thereof, preferably as the potassium salt.

The alkylenepolyaminopolycarboxylic acids which are useful in the BSS compositions of this invention have the formula (HOOC—CH$_2$)$_2$—N—[CH$_2$CH$_2$N(CH$_2$COOH)-]$_n$—CH$_2$—COOH

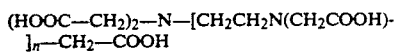

where n is an integer from 1 to about 4. Preferably n is 1 or 2. Most preferably, the alkylenepolyaminopolycarboxylic acid is ethylenediaminetetraacetic acid (sometimes hereinafter referred to as EDTA), or a mixture of EDTA and diethylenetriaminepentaacetic acid (sometimes hereinafter referred to as DTPA), wherein the weight ratio of DTPA to EDTA is in the range from 0 to 1 to about 3 to 1. Preferably the weight ratio of DTPA to EDTA in the alkylenepolyaminopolycarboxylic acid mixture is from about 0.5 to 1 to about 1.5 to 1. The alkylenepolyaminopolycarboxylic acid may be present in the BSS composition as a water soluble salt thereof, preferably as the potassium salt.

The polycarbazic acids which are useful in the BSS compositions of this invention have the formula (R)$_2$—N—[CH$_2$CH$_2$N(R)]$_m$—R  (I)

where R is the group CH$_2$—CO—NH—NH—COOH and m is 0 or an integer from 1 to about 4. Preferably m is 0 or 1. Most preferably the polycarbazic acid is derived from ethylenediaminetetraacetic acid, i.e., m=1, or a precursor thereof, or is a mixture of polycarbazic acids derived from ethylenediaminetetraacetic acid (m=1) or a precursor thereof and nitrilotriacetic acid (m=0) or a precursor thereof, wherein the weight ratio of the polycarbazic acid wherein m is 0 (sometimes hereinafter referred to as PCA-m0 for brevity) to the polycarbazic acid wherein m is 1 (sometimes hereinafter referred to as PCA-m1 for brevity) is in the range from 0 to 1 to about 1 to 1. The polycarbazic acid may be present in the BSS compositions of this invention as a water soluble salt thereof, preferably as the potassium salt.

The polycarbazic acids can be conveniently prepared according to the teachings of U.S. Pat. No. 4,609,757, incorporated herein by reference. Thus as taught therein, an aminopolycarboxylic acid, such as nitrilotriacetic acid, ethylenediaminetetraacetic acid, diethylenetriaminepentaacetic acid, and higher polyalkylenepolyaminopolyacetic acids, may be reacted with an excess of hydrazine to form a hydrazide wherein all of the acetic acid groups are converted to hydrazide groups, i.e., —CH$_2$COOH +NH$_2$—NH$_2$—CH$_2$—CO—NH—NH$_2$. The reaction is conveniently conducted in an aqueous solution in the presence of a water soluble alcohol such as methanol, ethanol, and the like, advantageously in less than the stoichiometric amount necessary to esterify all of the carboxylic acid groups of the aminopolycarboxylic acid. The aminopolycarboxylic acid first reacts with the lower alkanol to form a partial ester with the subsequent reaction of the ester group with the hydrazine to form the hydrazide group and the free alcohol. In this manner, the alcohol is then available for the continued esterification of the remaining carboxylic acid groups and the entire process continues until all of the carboxylic acid groups are converted to hydrazide groups. The ester of nitrilotriacetic acid is more reactive with hydrazine than are the ethylenepolyaminopolyacetic acids. Thus the excess hydrazine remaining after converting all of the carboxylic acid groups of the ethylenepolyaminopolyacetic acids to hydrazide groups can be reacted with nitrilotriacetic acid to form the corresponding hydrazide, if desired. In this manner, there is obtained a mixture of polycarbazic acids which is an excellent chelating mixture for use in the present invention.

The rate of reaction between the aminopolycarboxylic acid and hydrazine increases as the temperature increases. Generally, the temperature should be above about 65.6° C. (150° F), preferably above about 82.2° C. (180° F.). It is preferred, but not necessary, to keep the temperature less than 100° C. (212° F.) such that the reaction can be conducted at atmospheric pressure.

After formation of the hydrazide, the polycarbazic acid is preferably obtained by reacting the hydrazide with an alkali metal or ammonium carbonate to convert the terminal amino group (—$NH_2$) of each hydrazide group to the carboxyhydrazide (carbazic acid) group —NH—NH—COOH). In this case, there is obtained the alkali metal or ammonium salt of the polycarbazic acid. The polycarbazic acid is conveniently used in the water soluble salt form in the BSS compositions of this invention since the preferred pH of the aqueous sequestering solution is in the range from about 9.5 to about 14 as will be explained in detail hereinafter. The reaction of the polyhydrazide with the alkali metal or ammonium carbonate is preferably conducted at a temperature in the range from about 80° C. to about 120° C. The polycarbazic acid is conveniently formed by adding the alkali metal or ammonium carbonate to the polyhydrazide at the temperature at which the polyhydrazide is formed, and thereafter allowing the reaction mixture to cool to ambient temperature.

The active polycarbazic acids for use in the BSS compositions of this invention are those polycarbazic acids derived from aminopolycarboxylic acids as indicated hereinbefore in which all of the carboxylic acid groups are converted to hydrazide groups, and in which all of the hydrazide groups are converted to carbazic acid groups, or an alkali metal or ammonium salt thereof, and thus have the formula (I).

All other polycarbazic acids which may be present together with the desired polycarbazic acids as represented by formula (I) are inefficient chelating agents for barium cations and function as diluents thereof. Such inefficient polycarbazic acids may be represented by formula (I) wherein one or more of the R groups are independetly selected from the group consisting of $CH_2$—COOH and $CH_2$—CO—NH—$NH_2$.

Thus the operable, preferred, and most preferred barium sulfate sequestrant compositions of this invention are as set forth in Table A, for convenience.

TABLE A

| Barium Sulfate Sequestrant Compositions | | | |
|---|---|---|---|
| | Weight Ratios | | |
| | Citric Acid | Polycarbazic Acid | Alkylenepolyaminopolycarboxylic Acid |
| Operable | 0.5–11 | 0.002–0.2 | 1 |
| Preferred | 0.5–3.5 | 0.01–0.1 | 1 |

| Polycarbazic Acid $(R)_2N$—$[CH_2CH_2N(R)]_m$-R where R = $CH_2CO$—NH—NH—COOH | |
|---|---|
| Operable | m = 0, 1-4 |
| Preferred | m = 0, 1, or 2 |
| Most Preferred | m = 1 or a mixture wherein m = 0 (PCA-m0) and 1 (PCA-m1), and wherein the weight ratio of PCA-m0 to PCA-m1 is in the range from 0 to 1 to about 1 |

TABLE A-continued

| Barium Sulfate Sequestrant Compositions | |
|---|---|
| | to 1. |

| Alkylenepolyaminopolycarboxylic Acid (HOOC—$CH_2)_2$-N—$[CH_2CH_2N(CH_2$—COOH$)]_n$—$CH_2$—COOH | |
|---|---|
| Operable | n = 1-4 |
| Preferable | n = 1 (EDTA) |
| Preferred | n = 1 or a mixture wherein n = 1 and 2 (DTPA), and wherein the weight ratio of DTPA to EDTA is in the range from 0 to 1 to about 3 to 1. |
| Most Preferred | Weight ratio of DTPA to EDTA is in the range from about 0.5 to 1 to about 1.5 to 1. |

It is preferred that the barium sulfate sequestering compositions of my invention be formulated as concentrated aqueous solutions having a pH in the range from about 9.5 to about 14. The pH of the solution is obained by the additon of an alkali metal or ammonium base preferably selected from the group consisting of potassium hydroxide, potasium carbonate, sodium hydroxide, sodium carbonate ammonium hydroxide, ammonium carbonate, and mixtures thereof. Most preferably the base is selected from the group consisting of potasium hydroxide, potassim carbonate, and mixtures thereof.

In preparing the concentrated aqueous sequestering compositions, the pH should be raised above about 8.5 before addition of a carbonate salt to avoid excessive carbon dioxide evolution.

The BSS compositions have the unique ability to sequestor into aqueous solution the barium cation from insoluble barium salts. The rate of barium sequestration increases as the temperature increases. Preferably the temperature of the sequestering solution during sequestration of the barium cation is above about 65.5° C. (150° F.), most preferably at least 71.1° C. (160° F. It is preferred that the pH of the sequestering solution be in the range from about 9.5 to about 14, most preferably from about 10 to about 13.5.

The pH of the sequestering solution may be obtained by the addition of a base to the sequestering solution, and/or by the addition of a base to an aqueous solution of the BSS composition to prepare an aqueous concentrate thereof. Preferably the base is selected from the group consisting of potassium hydroxide, potassium carbonate, and mixtures thereof. Other bases which may be used to provide the desired pH are selected from the group consisting of sodium hydroxide, sodium carbonate, ammonium hydroxide, ammonium carbonate, and mixtures thereof. Most preferably the base comprises a mixture of potassium hydroxide and potassium carbonate.

The BSS compositions of the invention are useful for sequestering the barium cation from water insoluble barium compounds such as barium sulfate, or for preventing the formation of water insoluble barium compounds when the solubility product of the barium compound is exceeded. Barium sulfate scale, deposits, crystals, and the like, may form wherever the solubility product of barium sulfate is exceeded. Thus barium sulfate may be found on oil, gas, water, or injection well equipment, and also industrial equipment such as boilers, cooling towers, and the like. Typical oil and gas well equipment/surfaces on which barium sulfate may form include the casing, casing perforations, tubing, suckerrod, pumps, valves, packer, and the like. Barium sulfate may also be formed on the surface of the borehole, and indeed may be present within the subterranean formation. Removing the barium sulfate from such surfaces will increase the flow of oil and gas from the subterranean formation to the surface for recovery thereof.

Thus the present invention also provides processes for solubilizing and preventing the formation of barium sulfate which comprises contacting the barium sulfate with an aqueous solution of a sequestrant mixture comprising citric acid, an alkylenepolyaminopolycarboxylic acid, and a polycarbazic acid, the solution having a weight ratio of citric acid to the alkylenepolyaminopolycarboxylic acid in the range from about 0.5 to 1 to about 11 to 1 and a weight ratio of the polycarbazic acid to the alkylenepolyaminopolycarboxylic acid in the range from about 0.002 to 1 to about 0.2 to 1, the solution having a pH in the range from about 9.5 to about 14, wherein the alkylenepolyaminopolycarboxylic acid and the polycarbazic acid have the formulas presented hereinbefore. Preferably the weight ratio of citric acid to the alkylenepolyaminopolycarboxylic acid is within the range from about 0.5 to 1 to about 3.5 to 1 and the weight ratio of the polycarbazic acid to the alkylenepolyaminopolycarboxylic acid is within the range from about 0.01 to 1 to about 0.1 to 1. The pH of the solution is preferably obtained by neutralization of the sequestrant mixture with an excess of a base selected from the group consisting of potassium hydroxide, potassium carbonate, and mixtures thereof. Preferably the alkylenepolyaminopolycarboxylic acid is ethylenediaminetetraacetic acid (EDTA) or a mixture of diethylenetriaminepentaacetic acid (DTPA) and EDTA in which the weight ratio of DTPA to EDTA is in the range from about 0 to 1 to about 3 to 1, most preferably from about 0.5 to 1 to about 1.5 to 1.

The amount of insoluble barium salt solubilized by sequestration of the barium is dependent upon the amount of the sequestering composition which contacts the insoluble barium salt. The rate of barium sequestration increases as the temperature increases, as the concentration of the sequestrant composition in the sequestering solution increases, and as the pH of the sequestering solution increases to about 9.5. Above pH of about 9.5 the sequestration rate remains relatively constant. In many cases, depending on the location of the insoluble barium sulfate scale, it is not necessary to sequester all of the barium. Thus as the barium is sequestered and the barium sulfate dissolved, the barium sulfate scale disintegrates and can be flushed from the surface to which the scale adheres, and thus removed. In laboratory tests, this has consistently resulted in 225% more barium sulfate being removed from the surface to which the barium sulfate adheres as compared to the amount of barium sulfate which is dissolved. This effect appears to be unique for the compositions of this invention and is not exhibited by the components of the inventive compositions.

It is preferred that the sequestering solution contain from about 3% by weight to about 30% by weight of the sequestrant composition of this invention.

I have also found, and thus the invention also provides, a process of solubilizing barium sulfate at a temperature of at least about 82° C. (180° F.) which comprises contacting the barium sulfate with an aqueous solution comprising citric acid and ethylenediaminetetraacetic acid, the solution having a weight ratio of citric acid to EDTA in the range from about 2 to 1 to about 7.33 to 1, the solution having a pH in the range from about 9.5 to about 14, the pH being obtained by neutralization of the citric acid and the EDTA with an excess of a base selected from the group consisting of potassium hydroxide, potassium carbonate, and mixtures thereof. This solution will sequester barium at temperatures of at least 82° C. and thus solubilize barium sulfate although the capacity of this solution for barium and the rate of sequestration is markedly less than when the BSS compositions of this invention are used to sequester barium sulfate.

In applying the aqueous sequestering solutions to contact the barium sulfate, methods known in the art for the chemical removal of other water insoluble materials, such as calcium carbonate, calcium sulfate, magnesium hydroxide, iron oxide, and the like, may be used. Thus for the treatment of subterranean formations, the sequestering solution may be "squeezed" into the subterranean formation as a concentrated solution, or a dilute sequestering solution may be injected into the subterranean formation as in a waterflood whereby the barium sulfate is continuously contacted with the flowing solution.

The barium sequestering compositions of this invention can also be used with other chelating agents if desired. In particular, when used to inhibit the formation of barium sulfate deposits, the compositions of this invention are advantageously used in conjunction with other "threshold active" compounds, such as the polyphosphates, organic polyphosphonates, low molecular weight acrylic copolymers, low molecular weight maleic acid copolymers, and the like, all of which are well known in the water treatment field.

The following non-limiting examples are given to further illustrate the invention.

EXAMPLE A

Preparation of the Preferred Polycarbazic Acids 140.0 liters of water and 13.25 liters of methanol were heated to 60° C. (140° F.) in a jacketed, glass-lined reactor equipped with a mixer. 160.2 kg. of ethylenediaminetetraacetic acid (EDTA) and 204.3 kg. of a 55 wt. % active hydrazine solution were added and thereafter the mixing was continued at 87.8° C. (190° F.) for 24 hours. 81.2 kg. of nitrilotriacetic acid (NTA) were added and the mixing was continued for 6 hours. Thereafter, 479.4 kg. of anhydrous potassium carbonate were added, the heat turned off, and the mixing was continued for 2 hours. 221.45 kg. of water were then added to produce a polycarbazic acid solution containing 22.33 wt. % of the polycarbazic acid from EDTA (28.82% of the tetrapotassium salt) and 12.05 wt. % of the polycarbazic acid from NTA (15.82% of the tripotassium salt).

EXAMPLE B

The polycarbazic acid solution from Example A containing excess potassium ion was neutralized to a pH of 8.5 with 440.2 kg. of a 50 wt. % active citric acid solution, 0.35 liters of a surfactant comprising a mixture of polyethoxylated alkylphenols was added, and the solution diluted with water to a final volume of 1302 liters. Thus this solution of sequestrants/chelating agents contained 14.22 wt. % of the polycarbazic acid from EDTA (18.36 wt. % of the tetrapotassium salt), 7.68 wt. % of the polycarbazic acid from NTA (10.08 wt. % of the tripotassium salt), and 10.89 wt. % of citric acid (17.37 wt. % of the tripotassium salt).

This solution was used to prepare the preferred composition of this invention as set forth in Example 1.

EXAMPLE 1

A preferred concentrated barium sulfate sequestration composition of this invention was prepared by admixing in a suitable container 229.3 parts by weight water, 618.6 parts by weight of a 0 wt. % active citric acid (CA) solution, 90 parts by weight of diethylenetriaminepentaacetic acid (DPTA), 83.5 parts by weight of ethylenediaminetetraacetic acid (EDTA), and 34.4 parts by weight of the sequestrant solution of Example B, followed by adjustment of the pH of the solution to 10.89 with 398.1 parts by weight potassium hydroxide and 94.75 parts by weight potassium carbonate. There were then added 1.46 parts by weight of a surfactant (wetting agent) comprising a mixture of polyethoxylated alkylphenols.

This BSS composition thus contained 20.2 wt. % of CA, 5.81 wt. % DPTA, 5.39 wt. % EDTA, 0.316 wt. % of the polycarbazic acid from EDTA, and 0.170 wt. % of the polycarbazic acid from NTA, all of these acids being present as the potassium salts. Thus the weight ratio of CA to the combined weight of DTPA and EDTA is 1.8 and the weight ratio of the combined polycarbazic acids to the combined weight of DTPA and EDTA is 0.043.

EXAMPLE 2

Sequestering solutions were prepared containing 25% by weight total sequestrant, calculated as the acid form. The solutions had a pH of 10.5 by suitable adjustment of the pH with potassium hydroxide. The sequestrants utilized were citric acid, ethlyenediaminetetraacetic acid, diethylenetriaminepentaacetic acid, triethylenetetraaminehexaacetic acid, and the sequestrant compositions given in Example B and Example 1.

The sequestering solutions were evaluated for barium sequestration by contacting barium sulfate crystals (98% $BaSO_4$ obtained from Pfaltz & Bauer, Inc.) with 200 ml. of each sequestering solution at a temperature of 96° C. for 96 hours under conditions such that no water was lost from the solutions. Thereafter the solutions were filtered and the concentration of barium in solution determined by atomic absorption spectrophotometry. The data obtained are given in Table 1.

The data obtained indicate that the preferred sequestrant composition of this invention synergistically sequesters much more barium than is sequestered by the components of the composition.

TABLE 1

| Sequestrant/Chelant | $BaSO_4$ Dissolved, g. |
|---|---|
| Citric Acid | <0.10 |
| Nitrilotriacetic acid | <1.0 |
| Ethylenediaminetetraacetic acid | 2.61 |
| Triethylenetetraaminehexaacetic acid | 2.43 |
| Diethylenetriaminepentaacetic acid | 3.05 |
| Example B | 4.13 |
| Example 1 | 9.20 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, with the scope of the appended claims, the invention may be practiced by those skilled in the art and having the benefit of this disclosure, otherwise than as specifically described and exemplified herein.

I claim:

1. A composition for sequestration of barium sulfate comprising citric acid, a polycarbazic acid, and an alkylenepolyaminopolycarboxylic acid, wherein the weight ratio of said citric acid to said alkylenepolyaminopolycarboxylic acid is in the range from about 0.5 to 1 to about 11 to 1, and wherein the weight ratio of said polycarbazic acid to said alkylenepolyaminopolycarboxylic acid is in the range from about 0.002 to 1 to about 0.2 to 1.

2. The composition of claim 1 wherein said polycarbazic acid has the formula $(R)_2-N-[CH_2-CH_2-N(R)]_m-R$ where R is the group $CH_2-CO-NH-NH-COOH$ and m is 0 or an integer from 1 to about 4, and wherein said alkylenepolyaminopolycarboxylic acid has the formula $(HOOC-CH_2)_2-N-[CH_2-CH_2-N(CH_2-COOH)]_n-CH_2-COOH$ where n is an integer from 1 to about 4.

3. The composition of claim 2 wherein m is 0 or 1 and wherein n is 1 or 2.

4. The composition of claim 3 wherein said weight ratio of citric acid to said alkylenepolyaminopolycarboxylic acid is in the range from about 0.5 to about 3.5 and wherein said weight ratio of said polycarbazic acid to said alkylenepolyaminopolycarboxylic acid is in the range from about 0.01 to 1 to about 0.10 to 1.

5. The composition of claim 4 wherein m = 1 or said polycarbazic acid is a mixture of polycarbazic acids wherein m is 0 and 1, the weight ratio of said polycarbazic acid wherein m is 0 to said polycarbazic acid wherein m is 1 being in the range from about 0 to 1 to about 1 to 1, and wherein said alkylenepolyaminopolycarboxylic acid is ethylenediaminetetraacetic acid or a mixture of diethylenetriaminepentaacetic acid and ethylenediaminetetraacetic acid, the weight ratio of said diethylenetriaminepentaacetic acid to said ethylenediaminetetraacetic acid being in the range from about 0 to 1 to about 3 to 1.

6. The composition of claim 4 wherein m = 1 or said polycarbazic acid is a mixture of polycarbazic acids wherein m is 0 and 1, the weight ratio of said polycarbazic acids wherein m is 0 to said polycarbazic acid wherein m is 1 being in the range from about 0 to 1 to about 1 to 1, and wherein said alkylenepolyaminopolycarboxylic acid is a mixture of diethylenetriaminepentaacetic acid and ethylenediaminetetraacetic acid, the weight ratio of said diethylenetriaminepentaacetic acid to said ethylenediaminetetraacetic acid being in the range from about 0.5 to 1 to about 1.5 to 1.

7. The composition of claims 3, 4, 5, or 6 which contains sufficient water and base to provide a solution having a pH in the range from about 9.5 to about 14, said base being selected from the group consisting of potassium hydroxide, potassium carbonate, and mixtures thereof.

8. A process for solubilizing barium sulfate which comprises contacting said barium sulfate at a temperature of at least 82° C. with an aqueous solution of a sequestrant mixture comprising citric acid and ethylenediaminetetraacetic acid having a weight ratio of citric acid to ethylenediaminetetraacetic acid in the range from about 2 to 1 to about 7.33 to 1, said aqueous solution having a pH in the range from about 9.5 to about 14, said pH being obtained by neutralization of said sequestrant mixture with an excess of a base selected from the group consisting of potassium hydroxide, potassium carbonate, and mixtures thereof.

9. A process for solubilizing barium sulfate which comprises contacting said barium sulfate with an aqueous solution of the composition of claim 3, 4, 5, or 6, said aqueous solution having a pH in the range from about 9.5 to about 14.

10. A process for solubilizing barium sulfate which comprises contacting said barium sulfate with an aqueous solution of the composition of claim 3, 4, 5, or 6, said aqueous solution having a pH in the range from about 9.5 to about 14, said pH eing provided by a base selected from the group consisting of potassium hydroxide, potassium carbonate, and mixtures thereof 11. A process for preventing the formation of barium sulfate scale deposits in an aqueous system containing barium ions and sulfate ions which comprises adding to said aqueous system a precipitation inhibiting amount of the composition of claim 3, 4, 5, or 6.

* * * * *

UNITED STATES PATENT AND TRADEMARK OFFICE
CERTIFICATE OF CORRECTION

PATENT NO. : 4,708,805
DATED : November 24, 1987
INVENTOR(S) : Thomas F. D'Mukala It is certified that error appears in the above–identified patent and that said Letters Patent are hereby corrected as shown below:

At Column 9, line 8 (Example 1), "0 wt. %" should read --50 wt. %--.

Signed and Sealed this

Twenty-third Day of August, 1988

Attest:

DONALD J. QUIGG

Attesting Officer

Commissioner of Patents and Trademarks